(12) United States Patent
Nakayama et al.

(10) Patent No.: US 7,467,132 B2
(45) Date of Patent: Dec. 16, 2008

(54) SEARCH SUPPORTING APPARATUS, AND METHOD UTILIZING EXCLUSION KEYWORDS

(75) Inventors: Yasutomo Nakayama, Tokyo-to (JP); Shinkichi Hamada, Yamato (JP); Yuko Ito, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 10/845,631

(22) Filed: May 14, 2004

(65) Prior Publication Data

US 2004/0249804 A1  Dec. 9, 2004

(30) Foreign Application Priority Data

May 14, 2003  (JP)  ............... 2003-136519

(51) Int. Cl.
  *G06F 17/30* (2006.01)
  *G06F 15/16* (2006.01)
  *G06F 17/20* (2006.01)
(52) U.S. Cl. ........................... 707/3; 707/102; 709/203; 704/1
(58) Field of Classification Search .................. 707/3; 709/203; 704/1
  See application file for complete search history.

(56) References Cited

U.S. PATENT DOCUMENTS 6,460,029 B1 * 10/2002 Fries et al. ..................... 707/3
6,741,990 B2 * 5/2004 Nair et al. ....................... 707/9
6,904,427 B1 * 6/2005 Hagiwara et al. ............... 707/3
7,111,000 B2 * 9/2006 Wen et al. ....................... 707/5
2004/0141354 A1 * 7/2004 Carnahan ..................... 365/145
2004/0194141 A1 * 9/2004 Sanders ....................... 725/53
2006/0047649 A1 * 3/2006 Liang ........................... 707/4

FOREIGN PATENT DOCUMENTS

| JP | 03-294964 A | 12/1991 |
| JP | 05-342268 A | 12/1993 |
| JP | 06-195386 A | 7/1994 |
| JP | 06-309362 A | 11/1994 |
| JP | 09-218881 A | 8/1997 |
| JP | 11-025108 | 1/1999 |
| JP | 11-272709 A | 10/1999 |
| JP | 11-328202 A | 11/1999 |
| JP | 2000-029897 A | 1/2000 |
| JP | 2003-058574 A | 3/2003 |

\* cited by examiner

*Primary Examiner*—Miranda Le
(74) *Attorney, Agent, or Firm*—Sughrue Mion, PLLC

(57) ABSTRACT

Facilitating a user determination of an exclusion keyword in order to specify an efficient exclusion of an unwanted piece of data when the user narrows searching objects. Exclusion is accomplished in a system having a searching object data storage for storing pieces of searching object data, a searcher for performing a primary narrowing of the search, a common keyword extractor for extracting the common keywords associated with a piece of data, an input/output device for passing a selected keyword selected the extracted common keywords while receiving and displaying a result from an exclusion efficiency calculator. The exclusion efficiency calculator calculates exclusion efficiency and indicates a level of exclusion efficiency of data that is not associated with a selected keyword for an individual common keyword.

6 Claims, 8 Drawing Sheets

Document searching

| Keyword | Combinatorial condition | | Keyword |
|---|---|---|---|
| | — | | Automatic translation |
| | AND | ▽ | |
| | AND | ▽ | |
| | AND | ▽ | |

[Searching]

Number of hit items

1. Xxxxxxxxxxxxxxxxxxxxxxxxxxxxxxxxxxxxxxxx
2. Xxxxxxxxxxxxxxxxxxxxxxxxxxxxxxxxxxxxxxxx
3. Xxxxxxxxxxxxxxxxxxxxxxxxxxxxxxxxxxxxxxxx
4. Xxxxxxxxxxxxxxxxxxxxxxxxxxxxxxxxxxxxxxxx
5. Xxxxxxxxxxxxxxxxxxxxxxxxxxxxxxxxxxxxxxxx
6. Xxxxxxxxxxxxxxxxxxxxxxxxxxxxxxxxxxxxxxxx
7. Xxxxxxxxxxxxxxxxxxxxxxxxxxxxxxxxxxxxxxxx
8. Xxxxxxxxxxxxxxxxxxxxxxxxxxxxxxxxxxxxxxxx
9. Xxxxxxxxxxxxxxxxxxxxxxxxxxxxxxxxxxxxxxxx
10. Xxxxxxxxxxxxxxxxxxxxxxxxxxxxxxxxxxxxxxxx

[Common keyword list]   [Previous 10 items]   [Next 10 items]

FIGURE 3

Common keyword list

| Current keyword | Automatic translation |
|---|---|
| Number of detected documents | 519 items |

| Common keyword | Number of documents | Add with AND | Add with NOT | |
|---|---|---|---|---|
| Computer | 311 | ☐ | ☐ | Exclusion efficiency indication |
| Voice | 273 | ☐ | ☐ | Exclusion efficiency indication |
| Dictionary | 270 | ☐ | ☐ | Exclusion efficiency indication |
| Network | 161 | ☐ | ☐ | Exclusion efficiency indication |
| Image | 140 | ☐ | ☐ | Exclusion efficiency indication |

[Search again by adding this condition]   [Return to searching screen]

FIGURE 4

Exclusion efficiency

| Current search character string | Automatic translation |
|---|---|
| Number of detected documents | 519 items |

Exclusion efficiency for "network"

| Common keyword | Exclusion efficiency | Add with AND | Add with NOT |
|---|---|---|---|
| Dictionary | 0.511668 | ☐ | ☐ |
| Voice | 0.461764 | ☐ | ☐ |
| Computer | 0.408310 | ☐ | ☐ |
| Image | 0.408167 | ☐ | ☐ |

[Search again by adding this condition] [Return]

FIGURE 6

Exclusion efficiency

| Current search character string | Automatic translation |
|---|---|
| Number of detected documents | 519 items |

Exclusion efficiency for "network"

| Common keyword | Exclusion efficiency | Add with AND | Add with NOT |
|---|---|---|---|
| Dictionary | ▬▬ | ☐ | ☐ |
| Voice | ▬▬ | ☐ | ☐ |
| Computer | ▬▬ | ☐ | ☐ |
| Image | ▬▬ | ☐ | ☐ |

[Search again by adding this condition] [Return]

FIGURE 7

Exclusion efficiency

| Current search character string | Automatic translation |
|---|---|
| Number of detected documents | 519 items |

Exclusion efficiency for "network"

| Common keyword | Exclusion efficiency |
|---|---|
| Dictionary<br>Add with AND ☐<br>Add with NOT ☐ | |
| Voice<br>Add with AND ☐<br>Add with NOT ☐ | |
| Computer<br>Add with AND ☐<br>Add with NOT ☐ | |
| Image<br>Add with AND ☐<br>Add with NOT ☐ | |

[Search again by adding this condition] [Return]

FIGURE 8

SEARCH SUPPORTING APPARATUS, AND METHOD UTILIZING EXCLUSION KEYWORDS

BACKGROUND OF THE INVENTION

1. Field of the Invention

The invention relates to searching apparatus for providing the information to determine an exclusion keyword to specify an efficient exclusion of unwanted data when the user narrows searching object data. This is done by excluding data associated with a specified keyword. The keyword for exclusion is hereinafter referred to as an "exclusion keyword".

2. Background Art

A searching system is employed in a computer search of an enormous amount of data accumulated in a database. If the user inputs the searching conditions, the searching system searches the data in accord with the searching conditions, and presents results to the user.

When intended data is apparent, the searching operation is not too difficult. For example, in the case where field of search is book data, it is relatively easily searched employing the book title or publisher name as the searching condition, if it is known.

However, conversely, when desired information or data is not apparent, the searching operation may be sometimes difficult. For example, to search a book, the book title or publisher name is not designated, but the contents are referenced. Also, a patent journal disclosing a similar invention to a certain invention is not designated by the application number or publication number, but searched from the viewpoint of similarity of the inventive contents. In this case, a searching keyword is specified as the searching condition, and data associated with this searching keyword is extracted from the database as the data in accord with the searching condition.

By the way, in making the searching with the searching keyword, if the searching keyword is a very common term, a great amount of data is searched. Conversely, if the searching keyword is an uncommon term, searching objects are narrowed excessively, so that a very small amount of data is searched.

In the light of the difficulty of selecting the searching keyword, it was conventionally pointed out to present the candidates for the searching keyword as described in, for example Japanese Published Unexamined Patent Application No. 11-25108 (especially pages 5 to 9, FIGS. 1 to 3)

However, the invention of Japanese Published Unexamined Patent Application No. 11-25108 simply offered the information indicating what searching keyword is employed, on the assumption that a set of searching object data is narrowed by "AND" (searching object data is narrowed into data associated with the searching keyword).

Even if the searching object data is further narrowed by referring to this information, it is understood that all of the search field is really covered with the narrowed result. For example, in searching for the similar invention, it is of course understood that all of the patent journals have been really examined. There is always a possibility that the field of search for real object of the search is excluded based on the searching using the keyword or keywords added for narrowing.

To remove such a possibility, it is effective that the set of searching object data is not narrowed by "AND" but by "NOT" (by excluding the data associated with an exclusion keyword from the set of searching object data). For example, to investigate in Japanese "batto-de boru-wo umaku miito-suru houhou" (meaning "a method for causing the bat to meet the ball"), if the searching is made using the searching keywords "batto", "boru" and "miito", (since Japanese word "batto" means either a bat or vat; "boru", either a ball or bowl; and "miito", either to meet or meat) a number of pieces of data relating with cookery are hit, whereby the cookery relevant data is excluded from the searched results by designating the exclusion keywords related with cookery.

However, the conventional methods typical of Japanese Published Unexamined Patent Application No. 11-25108 did not deal with a determination of an exclusion keyword to specify for an efficient exclusion of an unwanted piece of data.

Thus, a clear need exists to solve the above-mentioned technical problems, and especially to facilitate a user to determine an exclusion keyword to specify for an efficient exclusion of an unwanted piece of data when the user narrows searching objects.

SUMMARY OF THE INVENTION

It is an object of the invention to facilitate a user to determine an exclusion keyword for an efficient exclusion of an unwanted piece of data when the user narrows searching objects.

In order to achieve the above object, the invention enables a computer to automatically present an exclusion keyword to specify efficient exclusion of unwanted pieces of data when the user narrows searching objects.

That is, the present invention provides a searching apparatus comprising storage means (corresponding to a storage within searcher 13) for storing pieces of searching object data, and providing means (corresponding to exclusion efficiency calculator 15 and input/output device 11) for providing information for determining an exclusion keyword to be specified for an efficient exclusion to exclude a piece of data associated with a specified exclusion keyword from pieces of searching object data stored in the storage means.

Moreover, the providing means may provide, as information, an exclusion efficiency that indicates a level of exclusion efficiency of data for an individual keyword associated with the searching object data when the keyword is specified as the exclusion keyword.

Herein, the exclusion efficiency may be calculated, for the individual keyword associated with the searching object data, based on (1) a first parameter indicating a level of exclusion efficiency of data in a set of part of the searching object data, and (2) a second parameter indicating a level of exclusion efficiency of data in a set of all of the searching object data when the keyword is specified as the exclusion keyword.

Also, the exclusion efficiency may increase as the value of the first parameter (the level of exclusion efficiency of data in a set of part of the searching object data) is smaller, and increase as the value of the second parameter (the level of exclusion efficiency of data in a set of all of the searching object data) is greater. The contribution levels of the first parameter and the second parameter to the exclusion efficiency may be set by the user, or automatically set by the computer in accordance with the kind of the searching object data. Furthermore, the providing means may provide the information in a format of making a difference between the contribution levels of the first parameter and the second parameter to the exclusion efficiency clear.

The invention provides a searching method characterized by the steps of extracting a plurality of common keywords associated with a piece of searching object data (corresponding to step 102), storing the plurality of extracted common keywords into storage means (corresponding to a storage within common keyword extractor 14) (corresponding to step 102), accepting a selected keyword selected by a user from the plurality of common keywords stored in the storage means (corresponding to step 103), calculating exclusion efficiency indicating a level of exclusion efficiency of data that is not associated with the selected keyword for an individual common keyword of the plurality of common keywords stored in the storage means except for the selected keyword when the common keyword is specified as an exclusion keyword (corresponding to steps 104 to 105), and providing the exclusion efficiency to a user (corresponding to step 106).

The calculating step may also include calculating the exclusion efficiency for an individual common keyword of the plurality of common keywords stored in the storage means except for the selected keyword. This calculation is based on the first parameter indicating a level of exclusion efficiency in a set of data that is associated with the selected keyword when the keyword is specified as the exclusion keyword and the second parameter indicating a level of exclusion efficiency in a set of all of the searching object data when the keyword is specified as the exclusion keyword.

The exclusion efficiency may increase as the value of the first parameter is smaller, and increase as the value of the second parameter is greater.

The searching method may further include a step of enabling the computer to automatically set the contribution levels of the first parameter and the second parameter to the exclusion efficiency in accordance with the kind of searching object data. Furthermore, the providing step may include providing the information in a format of making a difference between the contribution levels of the first parameter and the second parameter to the exclusion efficiency clear.

The invention also includes a program causing a computer to execute the operations of extracting a plurality of common keywords associated with a piece of searching object data (corresponding to common keyword extractor 14), storing the plurality of extracted common keywords into storage means (corresponding to a storage within common keyword extractor 14) (corresponding to common keyword extractor 14), accepting a selected keyword selected by a user from the plurality of common keywords stored in the storage means (corresponding to input/output device 11), calculating exclusion efficiency indicating a level of exclusion efficiency of data that is not associated with the selected keyword for an individual common keyword of the plurality of common keywords stored in the storage means except for the selected keyword when the common keyword is specified as an exclusion keyword (corresponding to common keyword extractor 14), and providing the exclusion efficiency to a user (corresponding to input/output device 11).

The calculating operation may include causing the computer to calculate the exclusion efficiency for an individual common keyword of the plurality of common keywords stored in the storage means except for the selected keyword based on a first parameter indicating a level of exclusion efficiency in a set of data that is associated with the selected keyword when the keyword is specified as the exclusion keyword and a second parameter indicating a level of exclusion efficiency in a set of all of the searching object data when the keyword is specified as the exclusion keyword.

The exclusion efficiency may increase as the value of the first parameter is smaller, and increase as the value of the second parameter is greater. Furthermore, the program may further include an operation for causing the computer to automatically set the contribution levels of the first parameter and the second parameter to the exclusion efficiency in accordance with the kind of the searching object data. Furthermore, the providing operation may include causing the computer to provide the information in a format of making a difference between the contribution levels of the first parameter and the second parameter to the exclusion efficiency clear.

BRIEF DESCRIPTION OF THE DRAWINGS

FIG. 3 is a diagram showing an example of a searching screen according to this embodiment;

FIG. 4 is a diagram showing an example of a common keyword list display screen according to this embodiment;

FIG. 6 is a diagram showing an example of an exclusion efficiency display screen according to this embodiment;

FIG. 7 is a diagram showing another example of the exclusion efficiency display screen according to this embodiment;

FIG. 8 is a diagram showing still another example of the exclusion efficiency display screen according to this embodiment;

DETAILED DESCRIPTION OF THE INVENTION

The preferred embodiments of the present invention will be described below in detail with reference to the accompanying drawings. The characteristic configuration of this embodiment will be described below in detail.

Figure 1:
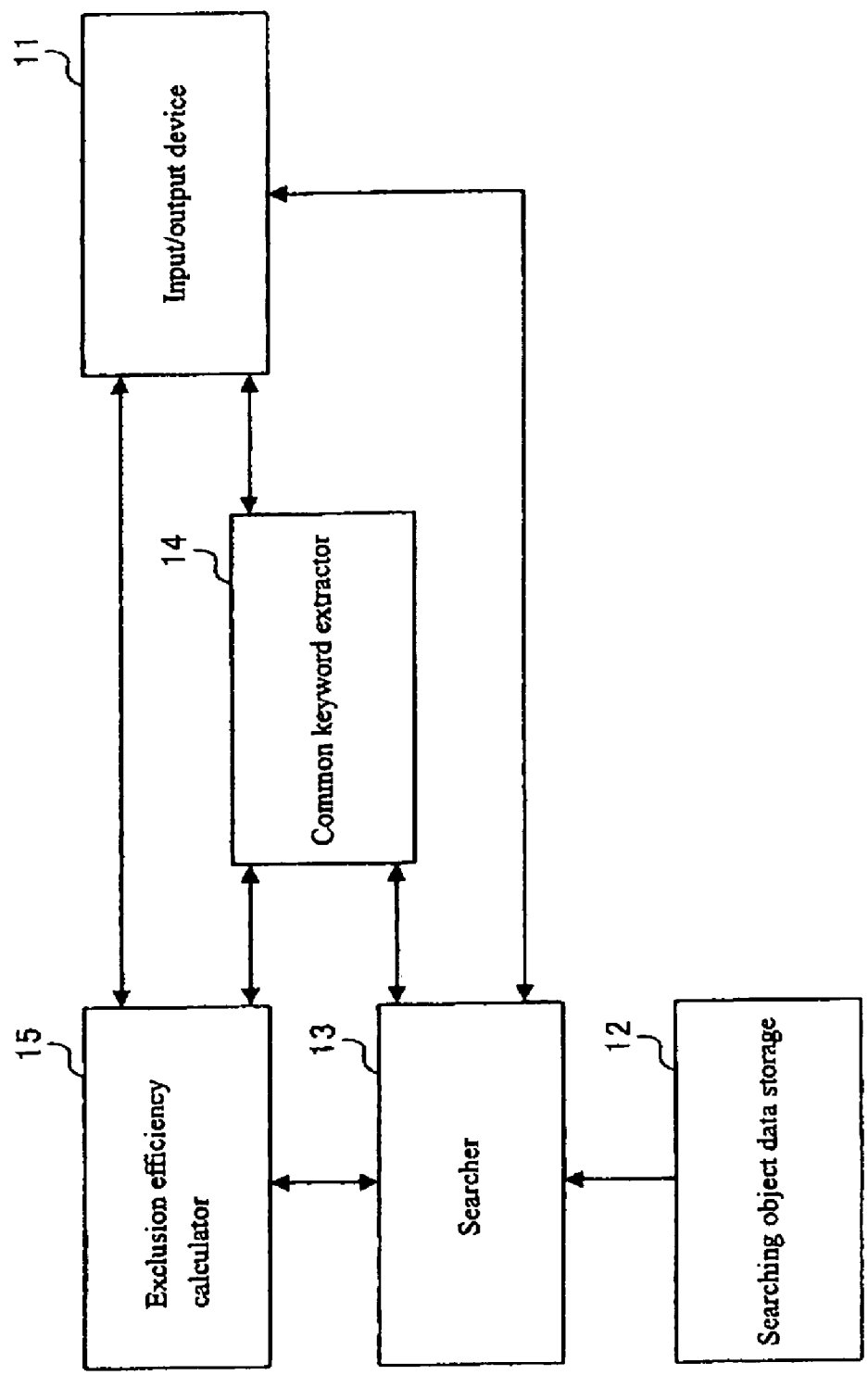
FIG. 1 is a block diagram showing the overall configuration of a searching apparatus according to an embodiment of the present invention.

FIG. 1 is a block diagram showing the overall configuration of a searching system according to this embodiment of the invention.

Figure 10:
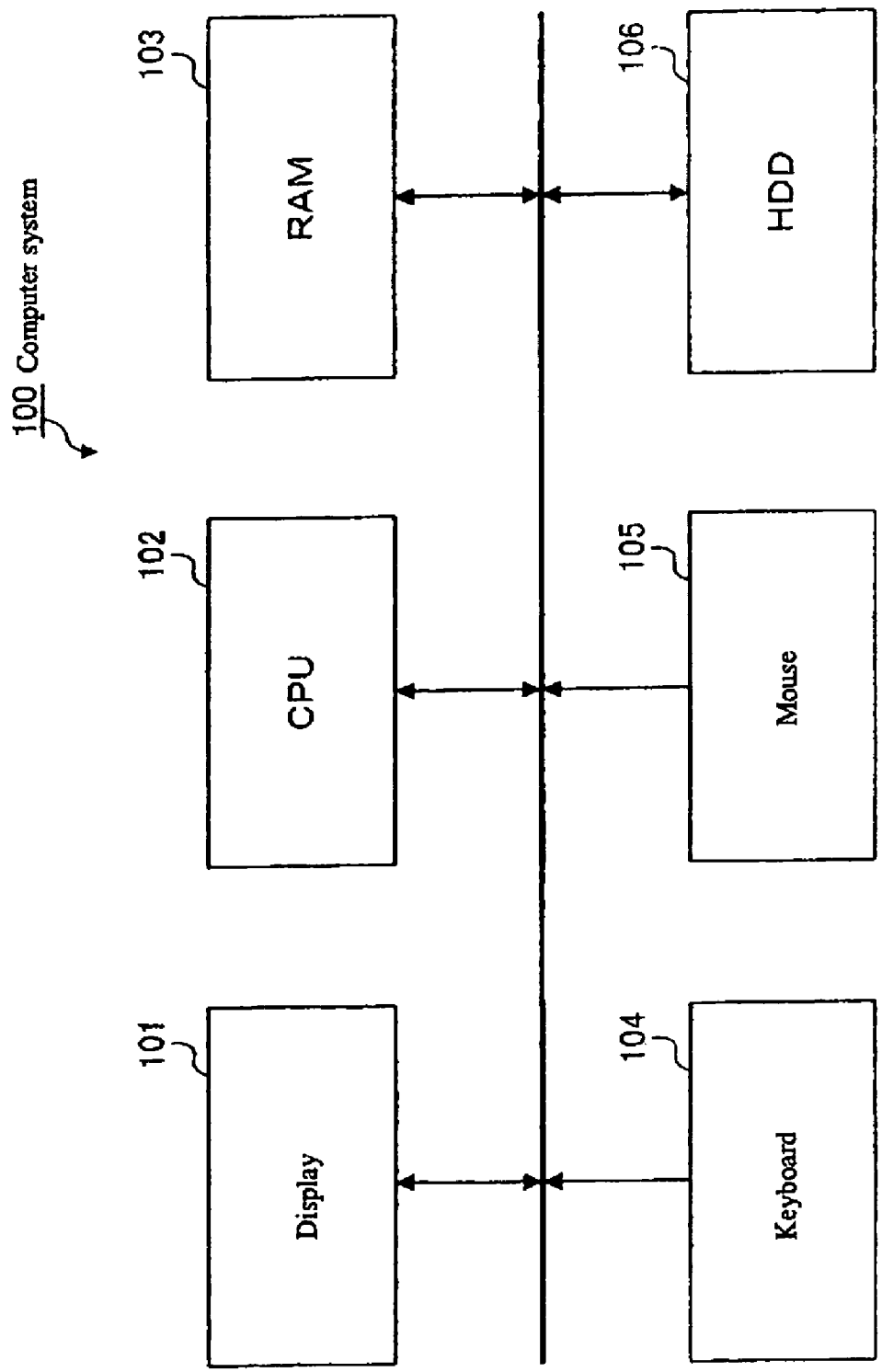
FIG. 10 is a block diagram showing a typical example of the hardware configuration of a computer system according to this embodiment.

Each functional block in FIG. 1 is implemented by cooperation of hardware resources of the computer system having the hardware configuration as shown in FIG. 10, and an operating system, a middleware, and software such as application programs that are performed in each hardware resource.

The searching system as shown in FIG. 1 includes an input/output device 11, a searching object data storage 12, a searcher 13, a common keyword extractor 14, and an exclusion efficiency calculator 15.

The input/output device 11 is a combination of an input unit such as keyboard 104 or mouse 105 and an output unit such as display 101, as shown in FIG. 10. A function of the input unit is to enter a search instruction, a common keyword extraction instruction and an exclusion efficiency display instruction input by the user to the searcher 13, the common keyword extractor 14 and the exclusion efficiency calculator 15, respectively. Also, a function of the output unit is to output a search result, a common keyword extraction result and an exclusion efficiency calculation result passed from the searcher 13, the common keyword extractor 14 and the exclusion efficiency calculator 15, respectively.

The searching object data storage 12 is the hard disk drive (HDD) 106, as shown in FIG. 10. The searching object data is accumulated and stored in a database.

The searcher 13 searches data stored in the searching object data storage 12 in accordance with a search instruction from the input/output device 11, and stores the searched result in its own storage. The common keyword extractor 14 extracts a keyword (hereinafter referred to as a "common keyword") commonly associated with some pieces of data of the searched result stored in the storage within the searcher 13, in accordance with a common keyword extraction instruction from the input/output device 11, and stores the extracted result in its own storage. The exclusion efficiency calculator 15 calculates the exclusion efficiency (detailed later) in accordance with an exclusion efficiency display indication from the input/output device 11. The searcher, extractor and calculator are implemented when the central processing unit (CPU) 102 performs a computer program expanded on the RAM 103. Also, the storage within the searcher 13 and the storage within the common keyword extractor 14 are realized by the RAM 103 or hard disk drive (HDD) 106.

Each functional block of FIG. 1 may be implemented not only in a single computer system having the system configuration as shown in FIG. 10, but also in a system composed of two or more computers, for example, a client/server system. In this case, the searching object data storage 12, the searcher 13, the common keyword extractor 14, and the exclusion efficiency calculator 15 are provided on a server computer, while the input/output device 11 is provided on a client computer. If the user inputs a search instruction, a common keyword extraction instruction or an exclusion efficiency display instruction into the client computer, the instruction is passed via a computer network to the sever computer, so that the searcher 13, the common keyword extractor 14 or the exclusion efficiency calculator 15 operates and the searched result, the common keyword extracted result or the exclusion efficiency calculated result is passed via the computer network to the client computer.

An operation procedure for this characteristic configuration will be now described in detail.

Figure 2:
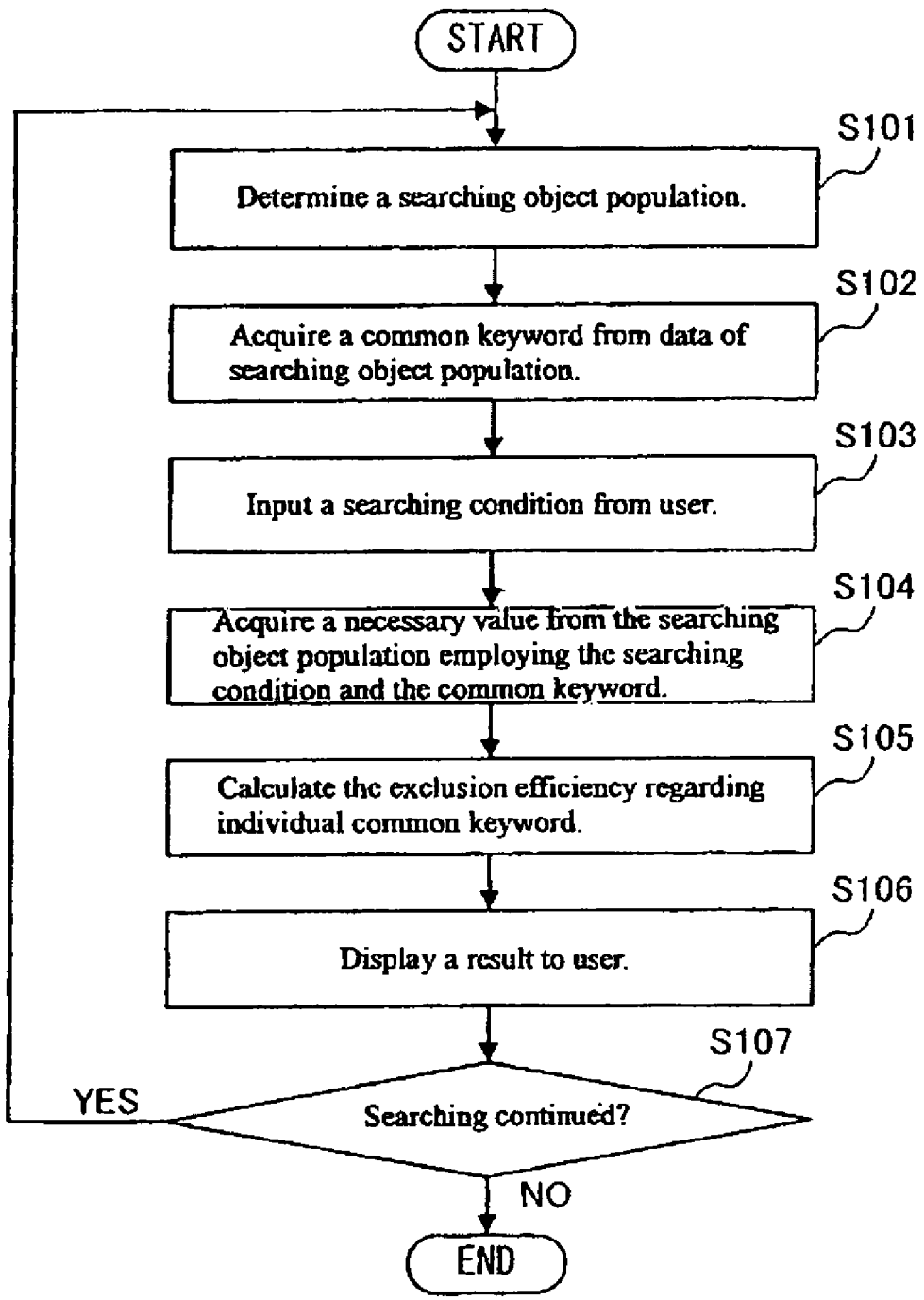
FIG. 2 is a flowchart showing a procedure of the searching system according to this embodiment.

FIG. 2 is a flowchart showing a procedure of the searching system according to the illustrated embodiment.

First of all, the searching system decides a searching object population (step 101). Specifically, the input/output device 11 firstly passes the searching conditions input by the user to the searcher 13. Then, the searcher 13 extracts data in accord with the searching conditions from among the data stored in the searching object data storage 12, extracted data being stored as the searching object population in its own storage and passed to the input/output device 11. Finally, the input/output device 11 presents the passed searching object population to the user. The searching conditions input here are employed to roughly narrow the data to obtain the desired information or data. Also, as the searching conditions, the attribute information attached to the searching object data may be specified, or the searching keyword may be specified. When the searching keyword is specified, it is determined whether or not the searching conditions are met, based on whether or not the keyword attached to the searching object data is matched with the searching keyword, or based on whether or not the searching keyword appears in the searching object data. A way of specifying the searching keyword may involve, in addition to specifying one searching keyword, inputting a plurality of searching keywords to be ANDed, or specifying a plurality of searching keywords and a logical operator.

Step 101 is optional and is not necessarily performed. That is, all the data stored in the searching object data storage 12 may be determined as the searching object population, or the searched result at the previous time may be directly made the searching object population.

Then, the searching system extracts a common keyword associated commonly with some pieces of data within the searching object population to create a common keyword list (step 102). Specifically, the input/output device 11 firstly passes a common keyword extraction instruction to the common keyword extractor 14 in accordance with a user's instruction, and the common keyword extractor 14 extracts a keyword commonly associated with some pieces of data in the searching object population stored in the searcher 13, stores it as a common keyword list in its own storage and passes its common keyword list to the input/output device 11. Finally, the input/output device 1 presents the passed common keyword list to the user.

Then, the searching system accepts an exclusion efficiency display instruction containing the searching conditions (step 103). Specifically, the input/output device 11 firstly accepts the exclusion efficiency display instruction containing the searching conditions input by the user, and passes it to the exclusion efficiency calculator 15. The searching conditions input here are employed to put the searching object population nearer to a searching desired range to obtain the desired information or data. Also, the searching conditions may include the attribute information attached to the searching object data, or the searching keyword. When the searching keyword is specified, it is determined whether or not the searching conditions are met, based on whether or not the keyword attached to the searching object data is matched with the searching keyword, or based on whether or not the searching keyword appears in the searching object data. A way of specifying the searching keyword may involve, in addition to specifying one searching keyword, inputting a plurality of searching keywords to be ANDed, or specifying a plurality of searching keywords and a logical operator.

The searching conditions at step 103 may be input by selecting a specific common keyword from among the common keywords extracted at step 102, or in accordance with the user's own decision, regardless of the common keywords extracted at step 102.

Then, the searching system acquires the necessary value to obtain the exclusion efficiency from the searching object population, employing the searching conditions and the common keywords (step 104). Specifically, the exclusion efficiency calculator 15 acquires those necessary values, based on the searching conditions passed from the input/output device 11 at step 103, the common keywords extracted and stored by the common keyword extractor 14 at step 102, and the searching object population determined and stored by the searcher 13 at step 101. Herein, the "exclusion efficiency" is an expected value at which the user can exclude the unwanted data from the searched result when the common keyword is employed as the exclusion keyword. The exclusion efficiency is computed on the basis of two parameters. A first parameter is a value indicating what extent of data is excluded among the data in accord with the searching conditions, when the common keyword is employed as the exclusion keyword. In other words, the first parameter indicates an intensity value of correlation between the searching conditions and the exclusion keyword. Also, a second parameter is a value indicating what extent of data is excluded among the searching object population, when the common keyword is employed as the exclusion keyword. Accordingly, two parameters are acquired for an individual common keyword at step 104.

The searching system calculates the exclusion efficiency regarding the individual common keyword, employing two parameters (step 105). Specifically, the exclusion efficiency calculator 15 calculates the exclusion efficiency regarding the individual common keyword, using a predetermined calculation expression in which the exclusion efficiency is higher with the smaller former parameter value and the larger latter parameter value.

Then, the searching system presents the exclusion efficiency to the user (step 106). Specifically, the exclusion efficiency calculator 15 passes the calculated exclusion efficiency to the input/output device 11, which outputs the passed exclusion efficiency.

Finally, the procedure for the searching system returns to step 101, if there is a searching instruction from the input/output device 11 again, or it is ended there is no searching instruction again (step 107).

The operation of the searching system in this embodiment will be described below using a specific example. In this specific example, the searching object data is "document data" for patent document or the like, and the searching conditions involve specifying the searching keyword, whereby it is determined whether or not the searching conditions are met, based on whether or not the searching keyword appears in the searching object data.

First of all, the user inputs the searching keyword and makes the searching. The input/output device 11 acquires the searching keyword, and passes it to the searcher 13. The searcher 13 searches and extracts the document data in which the searching keyword appears from among the searching object data stored in the searching object data storage 12, and displays the number (hit number) of extracted document data and the list of extracted document data (searched result list) (step 101).

For example, a case of a "system for translating a document transmitted via the network using the automatic translation" is investigated. In this case, one example of searching screen is illustrated in FIG. 3. FIG. 3 shows a display when the searching is made by inputting the "automatic translation" in the first line of the "keyword" column, and clicking the "searching button", in which 519 items are hit. Since 519 items can not be displayed on the screen at the same time, the first 10 items are displayed, and the following 10 items of undisplayed document data are displayed sequentially by clicking the "next 10 items" button.

By the way, even though 519 items as the "system for translating a document transmitted via the network using the automatic translation" are hit, they can not be examined at all, and thereby must be further narrowed. This narrowing may be of course possible by setting "AND" in the second column of the "combinatorial condition", inputting "network" in the second line of the "keyword" column, and clicking the "search" button to make the searching again.

However, a narrowing with "network" leads to excessive narrowing, thereby bringing about a danger that the necessary document data may be excluded. Thus, in this embodiment, the common keyword list that is the list of common keywords appearing commonly to some pieces of extracted document data is displayed, the exclusion keyword is selected from among the common keywords, and the document data in which the exclusion keyword appears is excluded.

As shown in FIG. 3, a "common keyword list" is provided on the search screen. And if the "common keyword list" is clicked, the common keyword list is displayed as shown in FIG. 4. Specifically, if the "common keyword list" button is clicked, the input/output device 11 passes the information indicating that the "common keyword list" button is clicked to the common keyword extractor 14. The common keyword extractor 14 extracts, as the common keyword, the keyword appearing commonly to some pieces of document data determined as the searching object population at step 101 and stores the common keyword with its frequency (number of document data containing the common keyword). Also, the common keyword extractor 14 passes the information regarding the common keywords to the input/output device 11, and the input/output device 11 displays the common keyword list in which the common keywords are arranged in the order of frequency (step 102).

In an example of FIG. 4, the common keywords include "computer", "voice", "dictionary", "network" and "image". Also, the common keyword list has a "number of documents" column, indicating the number of pieces of document data an individual common keyword appears in the searching object population. That is, the "computer" appears in 311 pieces of document, the "voice" appears in 273 pieces of document, the "dictionary" appears in 270 pieces of document, the "network" appears in 161 pieces of document, and the "image" appears in 140 pieces of document.

The words appearing commonly in the document data may involve generally employed words (e.g., "this", "it", "is" and so on) that are extracted as the words with especially high frequency. In this embodiment, such words are excluded beforehand, employing the dictionary, and prevented from being displayed at the upper level of the common keyword list. In this embodiment, such a method is not referred to.

The common keyword list has an "add with AND" column and an "add with NOT" column for individual common keyword. The user may check the "add with AND" by referring to the displayed information, and further narrow the data by the specific common keyword. If the user checks the "add with AND" for the "network" and makes the searching again, narrowing results in 161 pieces of document data.

However, a narrowing with "network" leads to excessive narrowing, whereby it is apprehended that the document data necessary to be searched may exist in the document data in which the keyword "network" does not appear. Thus, in this embodiment, an "exclusion efficiency indication" button is provided on the right column of the common keyword. Thereby, the user selects a specific keyword (hereinafter referred to as a "selection keyword") from the common keywords, and clicks the "exclusion efficiency indication" button on the right side of the selection keyword, whereby the user can refer to the exclusion efficiency regarding the selection keyword.

Herein, it is supposed that the user clicks the "exclusion efficiency indication" button corresponding to the selection keyword "network" (step 103). Then, the exclusion efficiency calculator 15 receives the information indicating that the selection keyword is "network", and calculates the first and second parameters on which the exclusion efficiency is based for individual common keyword (step 104).

A method for calculating the first and second parameters will be described below in the case where the selection keyword is "word0" and the exclusion keyword is "word1".

The first parameter is a value indicating the intensity of correlation between the selection keyword and the exclusion keyword. A calculation expression for the first parameter is set up so that the value of the first parameter is greater with stronger correlation between the selection keyword and the exclusion keyword. For example, in a case where the selection keyword is "word0" and the exclusion keyword is "word1", the first parameter is calculated employing the following formula.

$$\frac{\#(T(T(X, \text{word0}), \text{word1}))}{\#(T(X, \text{word0}))} \quad \text{[Formula 1]}$$

Where X is a searching object population set, T(X,word0) is a set of document data in which keyword word0 appears in the set X, and #(X) denotes the number of elements in the set X (same in the following formulas).

Also, the second parameter is a value indicating the number of documents excluded by specifying the exclusion keyword. A calculation expression for the second parameter is set up so that the value of the second parameter is greater when more documents are excluded. For example, in a case where the selection keyword is "word0" and the exclusion keyword is "word1", the second parameter is calculated employing the following formula.

$$\frac{\#T(X, \text{word1})}{\#(X)} \quad \text{[Formula 2]}$$

Figure 5:
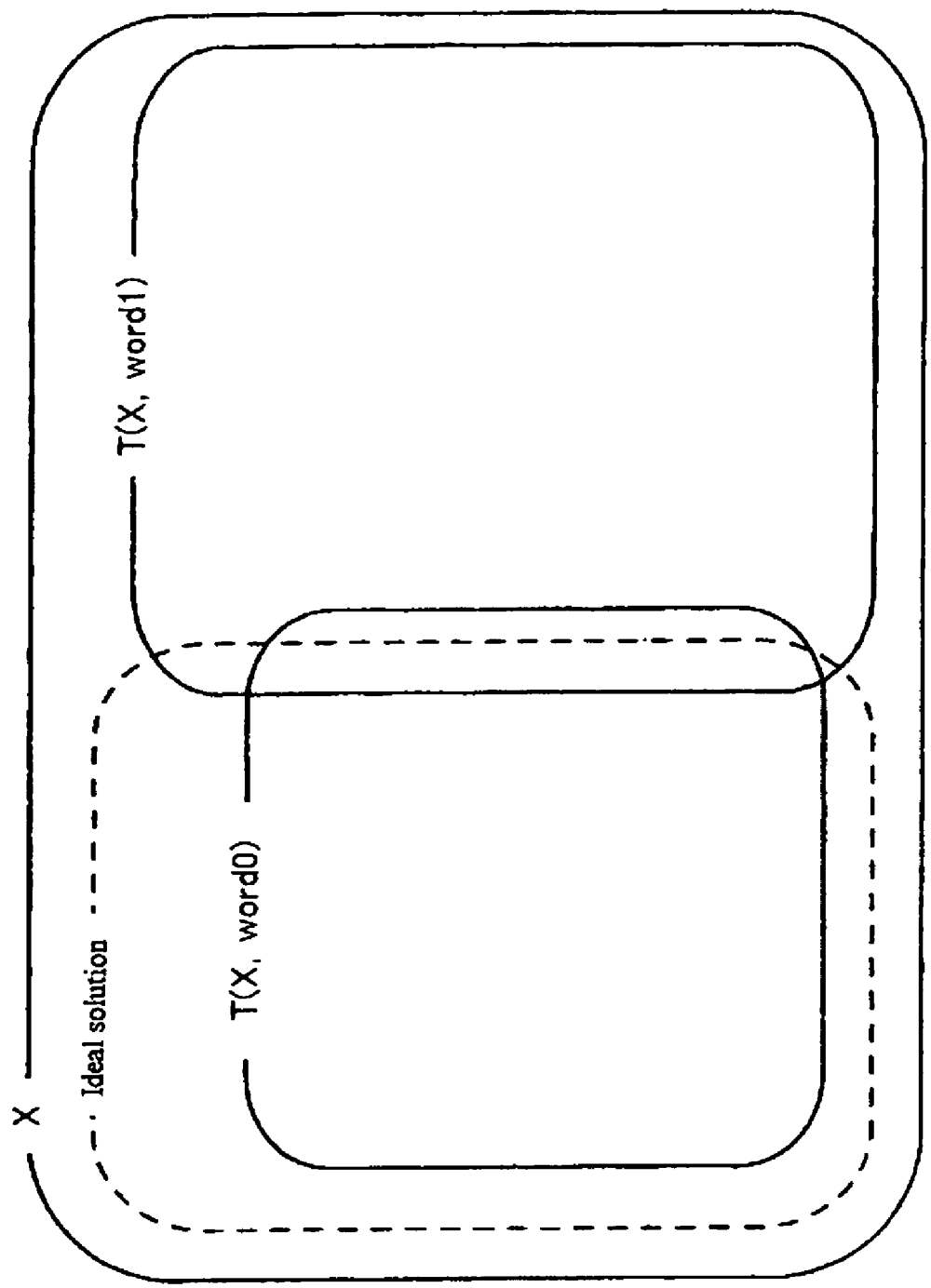
FIG. 5 is a diagram showing exclusion efficiency according to this embodiment.

FIG. 5 typically shows the exclusion efficiency. For the searching object population set X, an ideal solution is illustrated. Herein, to obtain a set of document data as close to the ideal solution as possible, suppose that data is narrowed by word0. However, there is a fear that the necessary documents may be excluded by narrowing with word0. Thus, instead of narrowing with word0, it is effective to select word1 as the exclusion keyword, and exclude the document data containing this exclusion keyword. In this embodiment, a determination material for selecting the exclusion keyword is presented. That is, referring to FIG. 5, the conditions of word1 to be selected as the exclusion keyword are that there is as little association with word0 as possible, and the exclusion key word1 excludes as many documents as possible. The former condition corresponds to a small ratio of area of T(T(X, word0), word1) to area of T(X,word0) in FIG. 5. Also, the latter condition corresponds to a high ratio of area T(X, word1) to area X in FIG. 5.

The exclusion efficiency calculator 15 calculates the exclusion efficiency from the first and second parameters (step 105). In this embodiment, the exclusion efficiency is calculated in accordance with the following formula, which satisfies the conditions where the exclusion efficiency increases as the first parameter is smaller, and increases as the second parameter is greater.

$$a\left(1 - \frac{\#(T(T(X, \text{word0}), \text{word1}))}{\#(T(X, \text{word0}))}\right) + (1-a)\left(\frac{\#T(X, \text{word1})}{\#(X)}\right) \quad \text{[Formula 3]}$$

Herein, 0<a<1. The first and second parameters take the value from 0 to 1, so that the exclusion efficiency has the value from 0 to 1.

The above formula 3 is one example for calculating the exclusion efficiency. In the above formula 3, the first parameter has coefficient a and the second parameter has coefficient (1–a) so that the addition of coefficients is equal to 1. However, any positive numbers a and b may be employed as the coefficients. Also, the value of coefficient may be set up according to each user's preference, or determined beforehand by the system. Also, the value of coefficient may be defined for each kind of searching object data, and determined based on the kind of searching object data to be processed at present and the definition information when the exclusion efficiency calculator 15 calculates the exclusion efficiency.

If the exclusion efficiency is calculated in the above way, the input/output device 11 displays the exclusion efficiency on the screen.

FIG. 6 shows one example of displaying the exclusion efficiency in this case. In FIG. 6, the exclusion efficiencies for common keyword "network" with respect to other common keywords are displayed in numerical values. Where a=0.5 is assumed.

Herein, supposing that "network" and "computer" appear in 126 documents, and setting #(X)=519, #(T(X,word0))= 161, #(T(X,word1))=311 and #(T(T(X,word0),word1))=126 in the formula 3, the exclusion efficiency of "computer" relative to "network" is calculated as 0.408310.

Also, supposing that "network" and "voice" appear in 97 documents, and setting #(X)=519, #(T(X,word0))=161, #(T (X,word1))=273 and #(T(T(X,word0),word1))=97 in the formula 3, the exclusion efficiency of "voice" relative to "network" is calculated as 0.461764.

Also, supposing that "network" and "dictionary" appear in 80 documents, and setting #(X)=519, #(T(X,word0))=161, #(T(X,word1))=270 and #(T(T(X,word0),word1))=80 in the formula 3, the exclusion efficiency of "dictionary" relative to "network" is calculated as 0.511668.

Also, supposing that "network" and "image" appear in 73 documents, and setting #(X)=519, #(T(X,word0))=161, #(T (X,word1))=140 and #(T(T(X,word0),word1))=73 in the formula 3, the exclusion efficiency of "image" relative to "network" is calculated as 0.408167.

In FIG. 6, the exclusion efficiency is displayed in the order of greater values. Also, this exclusion efficiency table has an "add with AND" column and an "add with NOT" column, in which the document data containing the exclusion keyword is excluded by checking the "add with NOT" column corresponding to the common keyword specified in the exclusion keyword, and clicking a "search again by adding this condition" button.

Moreover, FIG. 7 shows another example of displaying the exclusion efficiency. In FIG. 7, the exclusion efficiencies for common keyword "network" with respect to other common keywords are displayed in bar graph. The length of bar graph corresponds to the exclusion efficiency value of individual common keyword.

Also, as another example of displaying the exclusion efficiency, the display color of exclusion efficiency may be changed depending on the magnitudes of the first term and the second term in the formula 3. For example, the exclusion efficiency is displayed in red if the first term is greater, or in blue if the second term is greater, or in green if they are equivalent. Thereby, the exclusion keyword is selected in view of not only the magnitude of the exclusion efficiency, but also the balance between the first term (relevance) and the second term (exclusion). In this example, the first term in the formula for calculating the exclusion efficiency of "computer" is 0.108696 and the second term is 0.299615, in which since the second term is greater, the exclusion efficiency is displayed in blue. Also, the first term in the formula for calculating the exclusion efficiency of "voice" is 0.198758 and the second term is 0.263006, in which since the second term is greater, the exclusion efficiency is displayed in blue. Also, the first term in the formula for calculating the exclusion efficiency of "dictionary" is 0.251553 and the second term is 0.260116, in which since the first and second terms are equivalent, the exclusion efficiency is displayed in green. Also, the first term in the formula for calculating the exclusion efficiency of "image" is 0.273292 and the second term is 0.134875, in which since the first term is greater, the exclusion efficiency is displayed in red. This display method is applicable to both FIGS. 6 and 7.

To display the exclusion efficiency in the above way, the exclusion efficiency calculator 15 does not pass only the exclusion efficiency as the final result to the input/output device 11, but needs to pass the basic information for calculating the exclusion efficiency or the information obtained halfway on the calculation to the input/output device 11.

Figure 9:
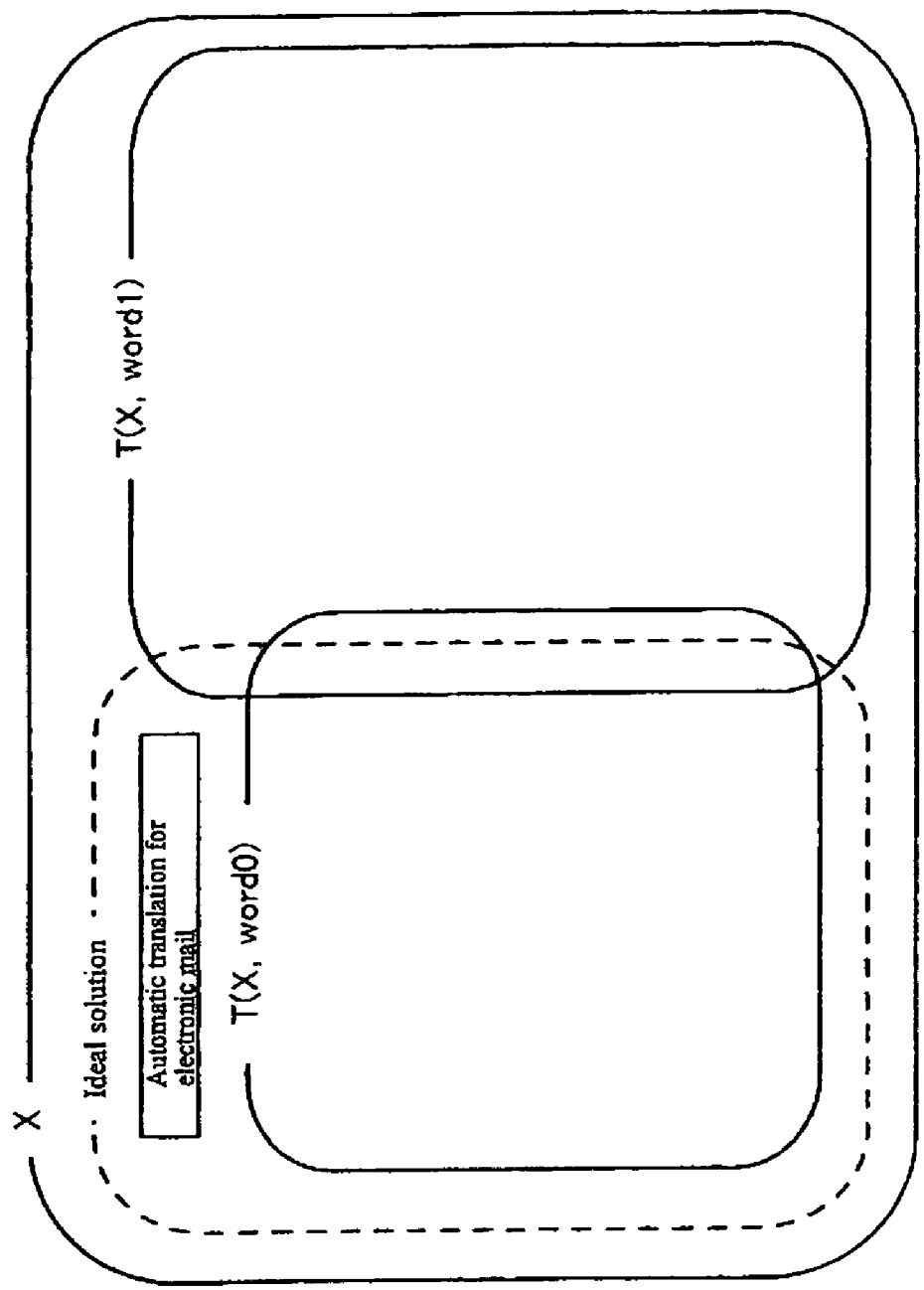
FIG. 9 is a diagram for explaining the exclusion efficiency according to this embodiment.

Also, FIG. 8 shows another example of the exclusion efficiency. In FIG. 9, a Venn diagram represents the percentage of T(X,word0) and T(X,word1), and their intersection occupied in X. In the display of the exclusion efficiency for individual common keyword, a range consisting of a left rectangle and a central rectangle corresponds to T(X,word0), and a range consisting of a right rectangle and the central rectangle corresponds to T(X,word1). Thereby, the exclusion keyword is selected in view of the balance between the first term (relevance) and the second term (exclusion).

To display the exclusion efficiency as shown in FIG. 8, the exclusion efficiency calculator 15 does not pass only the exclusion efficiency as the final result to the input/output device 11, but needs to pass the basic information for calculating the exclusion efficiency or the information obtained halfway on the calculation to the input/output device 11.

The user selects the word useful as the exclusion keyword with reference to the exclusion efficiency, and checks the corresponding "add with NOT". Then, if the user clicks the "search again by adding this condition" button, the searching system performs the searching again with a new QUREY sentence having the keyword added and displays the number of hit items and a list of hit document data.

In the displays as shown in FIGS. 6 to 8, "dictionary" has the highest exclusion efficiency. Thus, the user checks the "add with NOT" column corresponding to "dictionary", and clicks the "search again by adding this condition" button to make the searching again. For example, suppose that there is a document "automatic translation for electronic mail" necessary to examine, though "network" does not appear, as shown in FIG. 9. If the searching is made by combining "network" by "AND", this document is missed, but not missed by combining "dictionary" by "NOT".

In this embodiment, the exclusion efficiency calculator 15 calculates an index for designating the exclusion keyword to exclude an unwanted piece of data, and presents it to the user via the input/output device 11. In this way, the user easily knows the exclusion keyword to specify for an efficient exclusion of an unwanted piece of data.

FIG. 10 shows a typical example of the hardware configuration of a computer system usable in a searching system according to this embodiment. The computer system 100 includes a display 101, a central processing unit (CPU) 102, a RAM 103, a keyboard 104, a mouse 105, and a hard disk drive (HDD) 106. The display 101, the central processing unit (CPU) 102, the RAM 103, the keyboard 104, the mouse 105, and the hard disk drive (HDD) 106 are interconnected via a bus.

The display 101 is an output device for displaying the image that is graphically expanded on VRAM using a graphics control chip (VGA), for example. Also, the system may be connected to a printer, not shown, which is an output device to print the information via a parallel port.

The central processing unit (CPU) 102 controls the operation of the computer system 100 by executing a computer program expanded on the RAM 103.

The keyboard 104 or the mouse 105 is an input device for passing a user's instruction to the central processing unit (CPU) 102. Also, the mouse 105 is a typical pointing device, but other pointing devices such as a track ball, a track pad and a track point may be connected instead of the mouse 105.

The hard disk drive (HDD) 106 stores data used in the computer system 100. The data includes computer program codes, the central processing unit (CPU) 102 reads and executes the codes into the RAM 103 to implement the characteristic processings in this embodiment. Also, the computer system 100 may be connected to a removable storage (an external storage system in which the recording media is exchangeable) such as a flexible disk drive, a MO unit, or a CD-ROM unit, not shown. A portable recording medium such as a flexible disk, a MO or a CD-ROM is inserted into the removable storage such as flexible disk drive, MO unit or CD-ROM unit, in which the computer program codes may be stored in such portable recording medium. Moreover, the computer program codes may be compressed, or divided into plural blocks, which are recorded on a plurality of portable recording media.

Though not shown in FIG. 10, a modem may be connected via a serial port. Also, this computer system may be communicated with other computer apparatuses via the serial port and the modem, a communication adapter (Ethernet (registered trademark made by Xerox, USA) card or a token ring card) across the network.

In the above description, the computer system 100 in this embodiment of the invention may be realized by an information processing apparatus such as a main frame, a workstation, an ordinary personal computer (PC), a lap top PC, a notebook PC, a palm top PC, or a network computer, or a combination thereof. All these components, which are illustrative, may not be requisite components in this embodiment.

Various variations to each hardware component of the computer system 100 for use in this embodiment may be easily made by those skilled in the art, including combining a plurality of machines, or distributing the functions to those machines, and naturally encompassed within the concept of this invention.

This invention may be implemented by hardware, software or a combination of hardware and software. In the combination of software and hardware, the computer system 100 having a predetermined program is a typical example. In this case, the predetermined program is loaded into the computer system 100 and executed to control the computer system 100 to perform the processes of this invention. This program is composed of a group of instructions that can be represented in arbitrary language, code or notation. Such group of instructions enables the system to perform a specific function directly, or after 1. conversion into other language, code or notation, or 2. duplication onto other media, or both are performed. Of course, this invention may encompass not only such program itself, but also the medium recording the program within its scope. The program for performing the functions of the invention may be stored in a computer readable storage recording medium such as a floppy disk, MO, a CD-ROM, DVD, RAM 103, or hard disk drive (HDD) 106. Such program may be downloaded from another computer system connected via a communication line, or copied from another recording medium, for storage into the recording medium. Also, such program may be compressed or divided into plural block, which are stored in a single or plural recording media.

As described above, the invention provides a useful material for determining an exclusion keyword to specify for an efficient exclusion of an unwanted piece of data.

The invention claimed is:

1. A searching apparatus comprising:

processor means;

storage means for storing search object data;

means for selecting a population from the stored object data;

means for providing information for determining an exclusion keyword to be specified for an efficient exclusion to exclude a piece of data associated with a specified exclusion keyword from pieces of searching object data stored in said storage means, wherein an exclusion efficiency indicates a level of exclusion efficiency of data for an individual keyword associated with said searching object data when said keyword is specified as said exclusion keyword;

said means for providing information for determining an exclusion keyword comprises means for determining an exclusion efficiency of excluding a piece of data associated with a specified keyword comprising means for calculating exclusion efficiency for an individual keyword associated with said searching object data, based on a first parameter indicating a level of exclusion efficiency of data in a set of part of said searching object data when said keyword is specified as said exclusion keyword and a second parameter indicating a level of exclusion efficiency of data in a set of all of said searching object data when said keyword is specified as said exclusion keyword; wherein said exclusion efficiency increases as the value of said first parameter is smaller, and increases as the value of said second parameter is greater;

said first parameter indicating the intensity of correlation between a selection keyword and an exclusion keyword wherein the value of the first parameter is greater with stronger correlation between the selection keyword and the exclusion keyword, said first parameter being calculated using the following formula:

$$\frac{\#(T(T(X, word0), word1))}{\#(T(X, word0))}$$

where X is a searching object population set, T(X, word0) is a set of document data in which keyword0 appears in the set X, and #(X) denotes the number of elements in the set X, and the second parameter is a value indicating the number of documents excluded by specifying the exclusion keyword, wherein the calculation expression for the second parameter is set up so that the value of the second parameter is greater when more documents are excluded, the selection keyword is "word0" and the exclusion keyword is "word1", wherein the second parameter is calculated employing the following formula:

$$\frac{\#T(X, word1)}{\#(X)}$$

where T(X, word1) is a set of document data in which keyword1 appears in the set X, wherein the exclusion efficiency calculator calculates exclusion efficiency from the first and second parameters in accordance with the following formula, which satisfies the conditions where the exclusion efficiency increases as the first parameter is smaller, and increases as the second parameter is greater:

$$a\left(1 - \frac{\#(T(T(X, word0), word1))}{\#(T(X, word0))}\right) + (1-a)\left(\frac{\#T(X, word1)}{\#(X)}\right)$$

where 0<a<1, the first and second parameters taking a value from 0 to 1, whereby the exclusion efficiency has a value from 0 to 1;

wherein said providing means provides said information in a format of making a difference between the contribution levels of said first parameter and said second parameter to said exclusion efficiency clear; and means for providing said exclusion efficiency to a user.

2. The searching apparatus according to claim 1, wherein the contribution levels of said first parameter and said second parameter to said exclusion efficiency can be set by the user, or automatically set by the computer in accordance with the kind of said searching object data.

3. A searching method for use in a computer having a processor means and storage means, said method comprising the steps of:

extracting a plurality of common keywords associated with a piece of searching object data;

storing said plurality of extracted common keywords into storage means;

accepting a selected keyword selected by a user from said plurality of common keywords stored in said storage means;

calculating exclusion efficiency indicating a level of exclusion efficiency of data that is not associated with said selected keyword for an individual common keyword of said plurality of common keywords stored in said storage means except for said selected keyword when said common keyword is specified as an exclusion keyword, based on a first parameter indicating a level of exclusion efficiency in a set of data that is associated with said selected keyword when said keyword is specified as the exclusion keyword and a second parameter indicating a level of exclusion efficiency in a set of all of said searching object data when said keyword is specified as the exclusion keyword by the steps of:

(1) calculating said first parameter being calculated using the following formula:

$$\frac{\#(T(T(X, word0), word1))}{\#(T(X, word0))}$$

where X is a searching object population set, T(X, word0) is a set of document data in which keyword0 appears in the set X, and #(X) denotes the number of elements in the set X, and the second parameter is a value indicating the number of documents excluded by specifying the exclusion keyword, (2) calculating the second parameter using the following formula, where the selection keyword is "word0" and the exclusion keyword is "word1", and the second parameter is calculated employing the following formula:

$$\frac{\#T(X, \text{word1})}{\#(X)}$$

where T(X, word1) is a set of document data in which keyword1 appears in the set X, (3) calculating the exclusion efficiency from the first and second parameters in accordance with the following formula, which satisfies the conditions where the exclusion efficiency increases as the first parameter is smaller, and increases as the second parameter is greater:

$$a\left(1 - \frac{\#(T(T(X, \text{word1})))}{\#(T(X, \text{word0}))}\right) + (1-a)\left(\frac{\#T(X, \text{word1})}{\#(X)}\right)$$

where 0<a<1, the first and second parameters taking a value from 0 to 1, whereby the exclusion efficiency has a value from 0 to 1;
a providing step, wherein said providing step provides said information in a format of making a difference between the contribution levels of said first parameter and said second parameter to said exclusion efficiency clear; and providing said exclusion efficiency to a user.

4. The searching method according to claim 3, further comprising a step of enabling the computer to automatically set the contribution levels of said first parameter and said second parameter to said exclusion efficiency in accordance with the kind of said searching object data.

5. A computer program product comprising a computer readable storage recording medium having computer code thereon, said computer code causing a computer to execute the operations of:
  extracting a plurality of common keywords associated with a piece of searching object data;
  storing said plurality of extracted common keywords into storage means;
  accepting a selected keyword selected by a user from said plurality of common keywords stored in said storage means;
  calculating exclusion efficiency indicating a level of exclusion efficiency of data that is not associated with said selected keyword for an individual common keyword of said plurality of common keywords stored in said storage means except for said selected keyword when said common keyword is specified as an exclusion keyword, based on a first parameter indicating a level of exclusion efficiency in a set of data that is associated with said selected keyword when said keyword is specified as the exclusion keyword and a second parameter indicating a level of exclusion efficiency in a set of all of said searching object data when said keyword is specified as the exclusion keyword by the steps of:
(1) calculating said first parameter being calculated using the following formula:

$$\frac{\#(T(T(X, \text{word0}), \text{word1}))}{\#(T(X, \text{word0}))}$$

where X is a searching object population set, T(X, word0) is a set of document data in which keyword0 appears in the set X, and #(X) denotes the number of elements in the set X, and the second parameter is a value indicating the number of documents excluded by specifying the exclusion keyword, (2) calculating the second parameter using the following formula, where the selection keyword is "word0" and the exclusion keyword is "word1", and the second parameter is calculated employing the following formula:

$$\frac{\#T(X, \text{word1})}{\#(X)}$$

where T(X, word1) is a set of document data in which keyword1 appears in the set X, (3) calculating the exclusion efficiency from the first and second parameters in accordance with the following formula, which satisfies the conditions where the exclusion efficiency increases as the first parameter is smaller, and increases as the second parameter is greater:

$$a\left(1 - \frac{\#(T(T(X, \text{word0}), \text{word1}))}{\#(T(X, \text{word0}))}\right) + (1-a)\left(\frac{\#T(X, \text{word1})}{\#(X)}\right)$$

where 0<a<1, the first and second parameters taking a value from 0 to 1, whereby the exclusion efficiency has a value from 0 to 1;
a providing operation, wherein said providing operation comprises causing the computer to provide said information in a format of making a difference between the contribution levels of said first parameter and said second parameter to said exclusion efficiency clear; and providing said exclusion efficiency to a user.

6. The program product according to claim 5, further comprising an operation for causing the computer to automatically set the contribution levels of said first parameter and said second parameter to said exclusion efficiency in accordance with the kind of said searching object data.

\* \* \* \* \*